July 20, 1954     T. LODE     2,684,475
SUPERVISED SIGNALING SYSTEM
Filed June 26, 1952
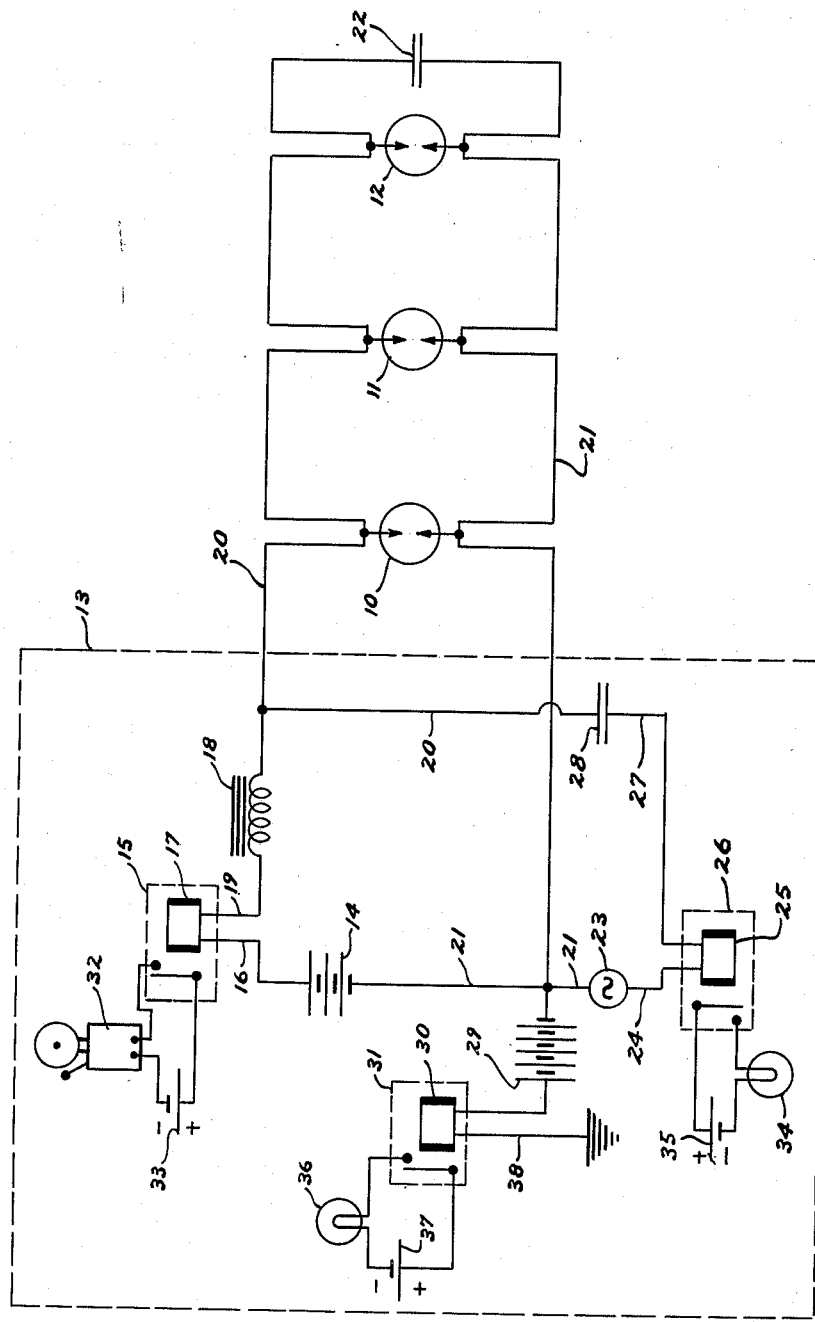
INVENTOR.
*TENNY LODE*
BY
*Braddock & Braddock*
ATTORNEYS Patented July 20, 1954

2,684,475

UNITED STATES PATENT OFFICE 2,684,475

SUPERVISED SIGNALING SYSTEM

Tenny Lode, St. Paul, Minn., assignor to General Sonics Corporation, Minneapolis, Minn., a corporation of Minnesota Application June 26, 1952, Serial No. 295,714

1 Claim. (Cl. 340—213)

This invention has relation to signalling systems used as fire alarms, burglar alarms, etc. In such a system, remotely located, normally electrically open detector units are connected by suitable wires to a warning device which operates when one of the detector units becomes electrically closed.

In order to afford maximum protection, such a system must be so constructed that any break or dislocation in the wiring will be immediately indicated at a central location. The present invention presents such a system.

In a device made according to the present invention, a direct current circuit including a plurality of normally open detectors is used to operate an alarm signal when any of these detectors become closed. A normally closed alternating current loop which includes the wires between the remotely located detector units and a central control location is used to indicate the presence of a break in these wires. Means is also provided for indicating when these wires become grounded.

In the accompanying drawing forming a part of this specification, the figure is a schematic view showing a specific embodiment of the invention.

The numeral 10 denotes a detector unit having normally open electrical contacts which is located at a point where detection is to take place. This unit can be a thermostatic unit having contacts which become closed in the presence of heat to indicate a fire, it can be a unit which has contacts which close in the presence of an unauthorized intruder to indicate a breakin, or it can be any one of a number of different types of normally open units which can become closed to cause a signal to be transmitted.

Other similar detector units are denoted 11 and 12. A central control box 13 may be located within sound and sight of a watchman.

The direct current alarm circuit includes a battery 14 and a normally open direct current relay 15. A wire 16 leads from the battery 14 to a coil 17 of said direct current relay 15. A choke 18 is for the purpose of preventing flow of alternating current and is connected to the coil 17 by a wire 19. A wire 20 extends from the choke coil 18 inside of the control box 13 to a first contact of each of the detector units 10, 11 and 12. A wire 21 extends from the battery 14 to a second contact of each of the detector units. A condenser 22 is connected between the wires 20 and 21 at position to have each of said detector units connected to the wires 20 and 21 between said condenser 22 and said control box 13.

A source of alternating current 23 is connected to the wire 21 at a point interior of the central control box 13. Wire 24 runs from said source of alternating current to a coil 25 of a normally closed alternating current relay 26. A wire 27 extends from the coil of normally closed relay 26 to a condenser 28 which is connected inside of the control box 13 to the wire 20. A battery 29 is connected from the wire 21 to a coil 30 of a normally open relay 31. A wire 32 leads from the coil 30 to ground.

In normal operation, when one or more of the detector units 10, 11 or 12 become closed, direct current will flow through the battery 14, the coil 17, the choke coil 18, along wire 20, through the detector unit, along wire 21 and back to battery 14. This current flowing in the coil 17 will cause the contacts of the relay 15 to become closed and an alarm bell 32, powered by a battery 33 will sound. The condenser 22, between the wires 20 and 21 will prevent passage of direct current so that the bell will not be sounded unless or until one or more of the detector units becomes closed.

During normal operation, there is an alternating current flowing in the alternating current circuit from the alternating current source 23, along wire 24, coil 25 of relay 26, wire 27, condenser 28, along the wire 20, through condenser 22, back along wire 21 to the alternating current source 23.

This alternating current flowing in the coil 25 will maintain the contacts of the relay 26 in an open condition. Should either the wire 20 or the wire 21 become open, the alternating current flowing in the coil 25 of relay 26 will be stopped and the relay will relax allowing the relay contacts to become closed and causing an open line indicator light 34, powered by a battery 35, to become lighted.

Should either the wire 20 or the wire 21 become grounded, a circuit will be set up through this ground, along wire 20, through choke 18, wire 19, coil 17, wire 16, battery 14 and wire 21 or directly along wire 21 to battery 29, coil 30 and back to ground. This would cause current flow in the coil 30 and would result in the contacts of the relay 31 being closed and would cause a short circuit indicator light 36, powered by a battery 37 to become lighted. The battery 29 will be of voltage sufficiently high with respect to the voltage of the battery 14 and the impedance of the coil 30 will be sufficiently high with respect to the impedance of the coil 17 so that the maximum current flowing in the coil 30 to operate the relay 31 will be insufficient to cause the relay 15 to be operated by the coil 17 when it is carrying the same current.

It is to be understood that the direct current circuit could be used as the constant current circuit and the alternating current circuit used as the normally open circuit by replacing the condenser 22 with a choke coil. Then the relay 15 would be of the normally closed variety and would operate the open line indicator light and the relay 26 would be of the normally open variety and would operate the alarm bell.

What is claimed is:

A signalling system consisting of a direct current circuit having in series a source of direct current energy, a relay coil of a first relay, an element for limiting flow of alternating current, a first wire, a detector unit having a pair of normally open contacts adapted to be closed and a second wire; an alternating current circuit having in series a source of alternating current energy, a relay coil of a second relay, first means for limiting flow of direct current, said first wire, a first of said pair of contacts of said detector unit, second means for limiting flow of direct current, a second of said pair of contacts of said detector unit and said second wire; a first alarm circuit comprising a source of electrical energy, a first electrically operated warning element and a pair of normally open contacts of said first relay; and a second alarm circuit comprising a source of electrical energy, a second electrically operated warning device and a pair of normally closed contacts of said second relay all in a series loop.

References Cited in the file of this patent

UNITED STATES PATENTS

| Number | Name | Date |
|---|---|---|
| 1,229,939 | Goldstein | June 12, 1917 |
| 1,537,211 | Wootton | May 12, 1925 |
| 2,276,706 | Sorensen | Mar. 17, 1942 |
| 2,469,001 | Poitras | May 3, 1949 |